Jan. 12, 1965     D. A. HARRIS ETAL     3,165,217

LIFT TRUCK WITH SUCTION COUNTERPOISE

Filed June 27, 1961     3 Sheets-Sheet 1

DONALD A. HARRIS
ROBERT C. SHOEMAKER
INVENTORS.

BY BUCKHORN, BLORE, KLARQUIST & SPARKMAN
ATTORNEYS

DONALD A. HARRIS
ROBERT C. SHOEMAKER
INVENTORS.

BY
BUCKHORN, BLORE, KLARQUIST & SPARKMAN
ATTORNEYS

Jan. 12, 1965     D. A. HARRIS ETAL     3,165,217
LIFT TRUCK WITH SUCTION COUNTERPOISE
Filed June 27, 1961     3 Sheets-Sheet 3

DONALD A. HARRIS
ROBERT C. SHOEMAKER
INVENTORS.
BY
BUCKHORN, BLORE, KLARQUIST & SPARKMAN
ATTORNEYS

3,165,217
LIFT TRUCK WITH SUCTION COUNTERPOISE
Donald A. Harris, Vancouver, Wash., and Robert C. Shoemaker, Portland, Oreg., assignors to Hyster Company, Portland, Oreg., a corporation of Nevada
Filed June 27, 1961, Ser. No. 119,903
2 Claims. (Cl. 214—670)

This invention relates to industrial lift trucks.

Present industrial lift trucks are equipped with heavy counterweights so that they will not tip during loading and unloading operations, or when the truck is being driven from one place to another with a load.

It is the main object of the present invention to provide an industrial lift truck without any counterweights, yet which truck is capable of handling the same kinds of loads as prior trucks, but on a smaller, lighter base.

Another object of the invention is to provide an industrial lift truck that is more maneuverable than present trucks.

Another object of the invention is to provide a lift truck which does not have to be accurately spotted when picking up or depositing a load.

A more specific object of the invention is to provide a truck having means for temporarily anchoring the truck to a surface on which the truck is traveling to enable the performance of loading and unloading operations, and wherein the load is located in a balanced or stable position on the truck when the truck is driven from place to place so that counterweights are not required.

Various other objects of the invention will be apparent from the following description taken in connection with the accompanying drawings wherein.

Figure 1:
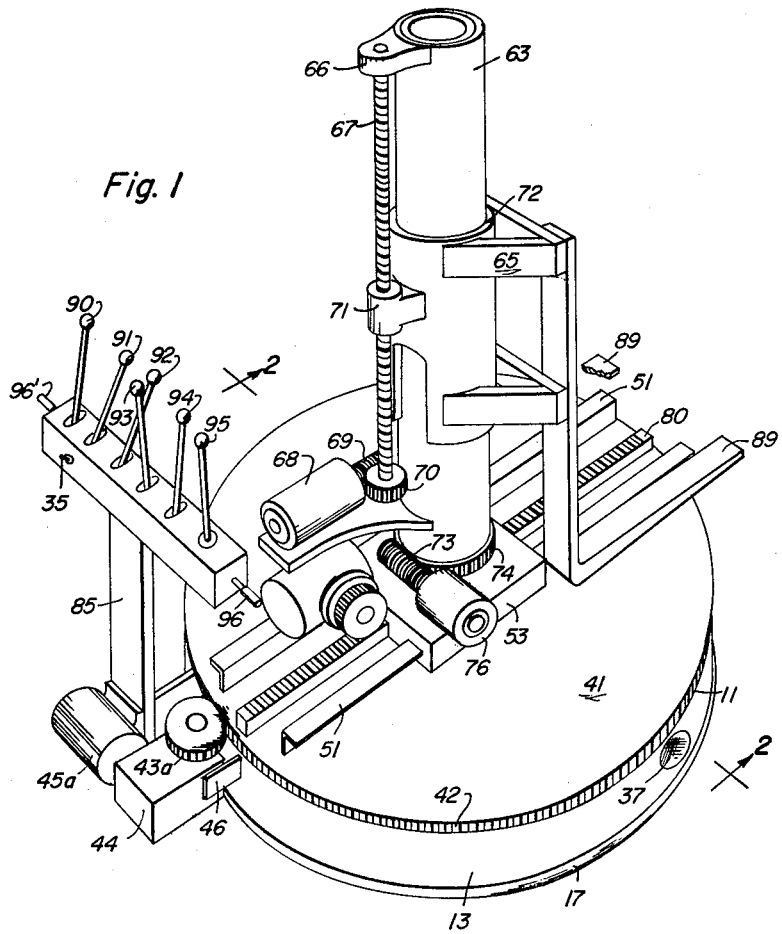
FIG. 1 is a perspective view of a truck embodying the concepts of the present invention.
Figure 2:
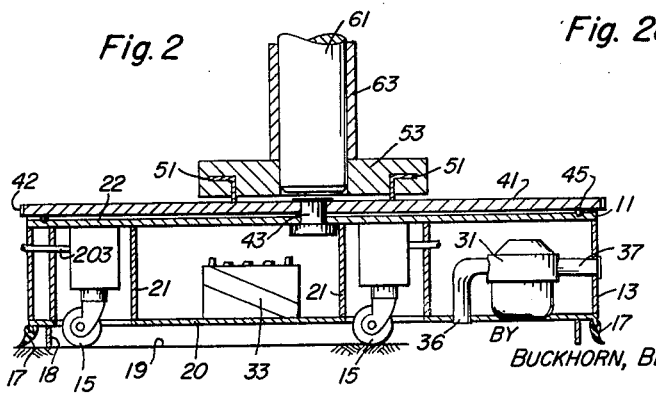
FIG. 2 is a fragmentary vertical section taken along line 2—2 of FIG. 1.
Figure 2A:
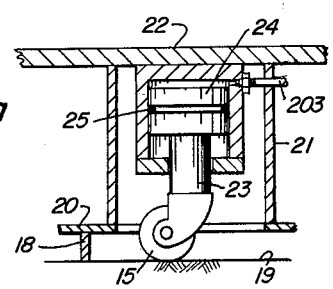
FIG. 2A is a fragmentary vertical section through a caster wheel structure.

Referring to FIGS. 1 and 2, the truck has a body or base frame 11 including a circular deck 22 equipped with a cylindrical skirt 13. The body is supported by a plurality of caster wheels 15, which are shown in FIGS. 2 and 2A. Each wheel is supported on a sliding spindle 23 with a piston 24 and an O-ring 25 so that the wheels may be retracted when the truck is to be anchored to the floor by vacuum. Hydraulic fluid to actuate the pistons is pressurized by a conventional hand pump, later referred to, which can raise the truck on the wheels, or lower it onto rim 18 when desired. Suitable conduits, one 203, being shown in FIG. 2A, extend in sealed relation through the walls of the wheel housings and then through the skirt 13.

The lower edge of the skirt 13 is equipped with an elastomer lip 17 (FIG. 2) for contacting the surface 19 when the truck is ready to pick up or deposit a load. It is contemplated that the truck will be used in places having surfaces against which a suction may be drawn. A typical surface would be one formed of concrete.

The rigid steel rim 18 is secured to the body of the truck and runs around the skirt just behind lip 17 and serves the dual purpose of preventing the lip from being drawn under the truck and supporting the weight of the truck when the latter is anchored to the floor and the wheels are retracted. The principal purpose of the latter provision is to give the truck the broadest possible base when it is called upon to support an overhanging load while held down by vacuum.

A sub-deck is provided a few inches above the floor as shown at 20 and the caster wheels operate within cylindrical housings 21 which are hermetically sealed to sub-deck 20 and to upper deck 22. The purpose of this is to reduce to a minimum the volume of air that must be evacuated to anchor the truck.

In order to create a subatmospheric pressure below sub-deck 20 and within the wheel housings, there is an electric air pump 31 (FIG. 2) mounted under the body. There is a battery 33 also mounted under the body and there is a switch 35 (FIG. 1) controlling the energization of the pump. The electrical conductors for the switch 35 extend through the skirt 13. The pump 31 has an inlet 36 (FIG. 2) communicating with the underside of sub-deck 20 and an outlet communicating with the ambient air through an outlet opening 37 best shown in FIG. 1.

Mounted on the body is a turntable 41 maintained in concentric relation to the base member 11 by a shaft 43 (FIG. 2). Suitable bearings 45 preferably are provided around the periphery of the turntable 41 and between the turntable and the base member 11. Turntable 41 is equipped with gear teeth 42 (FIG. 1) projecting beyond the skirt body 13. In driving relation with teeth 42 is gear 43a driven by an irreversible worm gear set in housing 44 driven by reversible motor 45a which is mounted on bracket 85 which in turn is attached to skirt 13. An additional brace 46 attaches housing 44 to skirt 13.

Fixed to turntable 41 in symmetrical relation with respect to the center line of the turntable 41 is a pair of tracks 51 of angle form. A support carriage 53 is slidably mounted on the tracks and is driven back and forth along the rack 80 by reversible motor 81 through a nonreversible worm, and gear. The motor 81 and associated parts are mounted on the support carriage 53, while rack 80 is secured to the turntable 41.

Fixed centrally to the support carriage 53 is an upstanding post 61 (FIG. 2). The sleeve 63 is rotatably received by the post, and slidably mounted on the sleeve is a load carriage 65 (FIG. 1). An acme or circulating ball screw 67 is mounted on an axis parallel to the axis of the mast between bearings mounted on brackets 75 and 66. The latter are secured to sleeve 63. Screw 67 is powered in either direction by motor 68 through an irreversible worm 69 and a worm gear 70 which is keyed to the screw. A nut 71 is mounted on a sleeve 72 which constitutes a part of the carriage and causes the carriage to go up and down as screw 67 rotates.

The load carriage, of which sleeve 72 is a part, has a pair of fork arms 89 projecting therefrom for engaging a load. While means providing for forward and rearward tilting movement of the fork arms relative to the mast are not shown, obviously such an arrangement can be provided. For instance, the forks may be connected to a conventional sub-carriage which is pivotally mounted on the main carriage. The sub-carriage may be provided with a suitable motor and lead screw for tilting the carriage, similar to that used for elevating the carriage.

Rotation of sleeve 63 and all the elements mounted thereon about standing post 61 is caused by motor 76, mounted on support carriage 53, irreversible worm 73 and worm gear 74; the latter being keyed to sleeve 63.

Control levers 90 through 93 are provided for motors 68, 76, 81, and 45 respectively and are mounted on bracket 85 which is anchored to skirt 13. Lever 94 is for load carriage tilt if tilt is provided. Each lever causes its corresponding function to go one direction when lever is pulled and in the opposite direction when the lever is pushed and each is detented at the center of "hold" position. As indicated, all the functions are driven by irreversible worm and gear sets so the established positions will be maintained unless driven one way or the other by the respective motors. Control wires are not shown but they are strictly conventional and so arranged that they will not restrict the various motions which have been described.

Lever 95 is connected to a hydraulic pump-tank unit concealed below the lever for raising and lowering the wheels 15 by pistons 24.

The entire unit in this embodiment is a manually propelled and steered by the operator, who walks behind it and grasps stationary handles 96 and 96'. Larger embodiments of the invention may be power driven.

*Operation*

When the truck is proceeding to pick up a load at floor level, the mast, carriage and forks will be moved to one end of tracks 51 so that the forks project beyond the clearance line of the circular base of the truck. In this position, the forks can be lowered to the ground and the truck can be maneuvered in a conventional manner like any other lift truck. Before picking up the load, however, the truck will be anchored to the floor by vacuum, because lacking counterweights and a long wheel base, it will not be stable otherwise. The pump 31 has sufficient capacity with respect to the area encircled by the elastomer lip 17 to create a sufficient subatmospheric pressure within the lip as to anchor the truck to the surface upon which it travels so as to prevent its movement and also tipping thereof. To anchor the truck, the operator lowers it to rest on rim 18 and engages switch 35 which starts vacuum pump 31. After being anchored to the floor, all manipulation involved in withdrawing the load must take place on the body of the truck itself because it can no longer move like a conventional truck. It is apparent that the various functions of table rotation, mast transit, mast rotation and lift can all be performed simultaneously or in sequence at the will of the operator, so that the load can be moved to a position within the clearance line of the circular body with its center of gravity substantially over the wheels. With the load in this position, the operator jacks down the wheels with lever 95 and moves on.

The unloading operation is the exact reverse of the loading operation. Prior to depositing the load, the truck must be anchored to the floor by vacuum so that when the load is extended beyond the circular body, it will not tip the truck over. Due to the various motions provided, however, the load can still be maneuvered into exact position even though the body of the truck is anchored to the floor.

Instead of suction counterpoise, suitable magnets could be provided for anchoring the body temporarily to a ferro magnetic floor.

Figure 3:
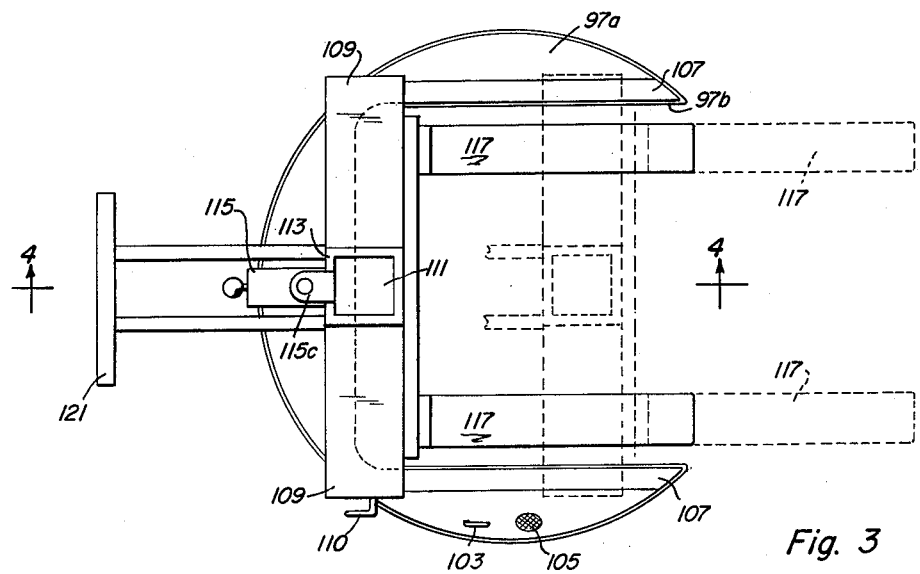
FIG. 3 is a top view of a modified form of truck.
Figure 4:
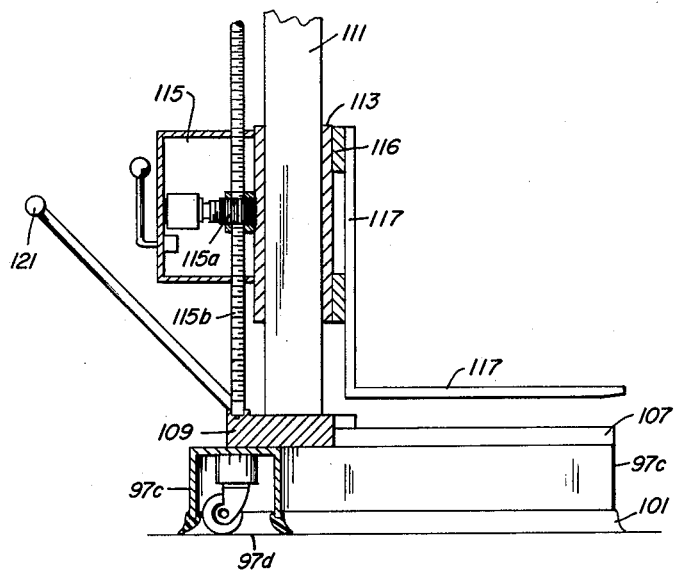
FIG. 4 is a vertical section taken along line 4—4 of FIG. 3.

FIGS. 3 and 4 show a modified form of invention in which the truck body includes a base member 97a of circular shape in plan but having a square recess 97b formed therein. A skirt 97c shown in FIG. 4 is provided around the periphery of the base member 97a and the skirt defines a well at the recess 97b. The provision of the recess provides the body with a pair of forwardly projecting wings. The body of the truck is supported by a plurality of casters 97d, one of which is shown in FIG. 4 and is disposed centrally at the rear of the body. There are other casters with at least one smaller caster at the forward end of the wings of the body.

There is an elastomer flap 101 extending around the bottom edge of the skirt 97c in engagement with the floor. The body contains a battery, electric motor and switch similar to the first form of the invention, but these are not shown and only a switch handle 103 and an outlet 105 are shown in FIG. 3.

On the upper surface of the base member 97a is a pair of fixed tracks 107 similar to the tracks in the first form of the invention. A support carriage 109 is slidably mounted on the tracks, for manual movement, a suitable friction brake having a handle 110 being provided on the support carriage to enable it to be temporarily locked in any position along the tracks. Fixedly mounted centrally on the carriage 109 is a mast 111 of rectangular cross section. A load carriage 113 has a body of rectangular cross section slidably fitting on the mast 111 for vertical movement therealong. A nonreversible motor unit 115 is provided on the carriage 113 to enable vertical movement of the load carriage to be effected by means of a rotary nut 115a driven by the motor and riding on a stationary screw 115b. A bracket 115c supports the upper end of the screw.

The load carriage 113 has a pair of horizontal support pieces 116 to which is secured a pair of fork arms 117. While the arms are not mounted for tilting movement, they could be so mounted if desired. It is pointed out that the width of the forks is such that they can fit into the well 97b of the truck body so that the fork arms may be lowered into engagement with the floor while in the position shown in FIG. 3. A suitable handle 121 is provided on the support carriage 109 to enable the truck to be moved from place to place and turned by applying lateral pressure to the handle.

In operation, it is assumed that the carriage 109 will be braked and the truck is shoved to the desired position by use of the handle 121. Then, a suction is drawn in the body of the truck to temporarily anchor the body to the supporting surface. The construction is such that a sufficient subatmospheric pressure can be drawn within the area encompassed by the lip 101 as to anchor the truck in place and prevent its movement and also tipping thereof. Thereafter, the brake for the support carriage is released to enable the support carriage to be shoved forwardly to insert the fork arms 117 beneath the load. It is pointed out that in this truck, the fork arms can be lowered down to floor level before being inserted beneath a load and therefore this truck can pick up a load at floor level while the base of the truck is adjacent to the load. This provision allows the truck to load and unload in an aisle very little wider than the diameter of the truck. It is obvious that casters similar to those of FIGS. 1, 2 and 2A could be used in the FIGS. 3 and 4 form of the invention. If so, a rim like that used in FIG. 2 would be employed.

Figure 5:
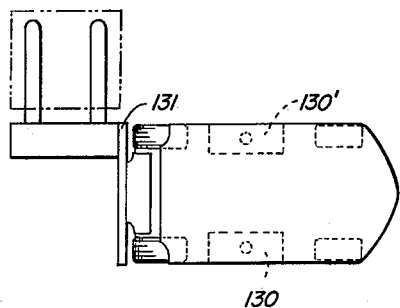
FIGS. 5 and 6 show another modified form of truck.
Figure 6:
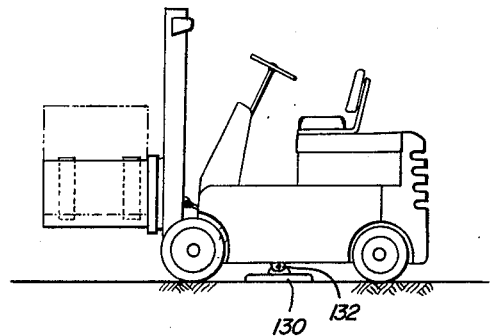

Many persons have been experimenting with side loading and unloading attachments. These never have had very broad application, however, because when the load is off to one side as shown in FIG. 5, the truck is quite unstable and the load must be reduced below a practical limit. We propose to mount suction cups 130 and 130', which can be energized to stabilize the truck against side tipping until the load has been moved across the face of the carriage 131 so as to center it. The source of subatmospheric pressure for the suction cups 130 and 130' has such a capacity, in relation to the area of the suction cups, as to create subatmospheric pressure sufficient to anchor the truck to the floor and prevent its movement and also tipping thereof. There is a retraction mechanism indicated at 132, so that the suction cups will not drag on the floor during transit. On this truck, which is normally equipped for hydraulics, it would naturally involve a cylinder on each cup. It should be noted that the attachment should be a loose pivot acting at the center of the cup so as to avoid the possibility of "peeling" the cup off the floor. Obviously, if the uplift should be applied at one end of the cup, the cup would be only about half as effective as it would be if the force were applied at the center of the cup.

Having described the invention in what is considered to be the preferred embodiment thereof, it is desired that it be understood that the invention is not to be limited other than by the provisions of the following claims.

We claim:

1. An industrial lift truck comprising a body having wheels for engaging a surface on which said truck is to be operated, load engaging means, means mounting said load engaging means on said body for movement from a first position to a second position so laterally displaced from said first position as to render said truck unstable when handling a load near the capacity of the truck,
and suction means for temporarily anchoring said body to said surface during loading and unloading operations to prevent tipping of said body,
said body having a periphery,
said wheels being located within the confines of such periphery,
said suction means extending around such periphery exteriorally of said wheels.

2. An industrial lift truck comprising a body having wheels for engaging a surface on which said truck is to be operated,
load engaging means,
means mounting said load engaging means on said body for movement from a first position to a second position so laterally displaced from said first position as to render said truck unstable when handling a load near the capacity of the truck,
suction means for temporarily anchoring said body to said surface during loading and unloading operations to prevent tipping of said body,
means for raising said suction means to a position spaced from said surface and for lowering said suction means for engagement with said surface,
and means for connecting said suction means to a source of subatmospheric pressure to cause said suction means to adhere to said surface and for connecting said suction means to the ambient air to break said vacuum,
said suction means having an effective center within the wheel base of said truck,
said body having a curved periphery,
said wheels being located within the confines of such periphery,
said suction means extending around such periphery exteriorally of said wheels.

References Cited in the file of this patent
UNITED STATES PATENTS

| | | |
|---|---|---|
| 371,281 | Siemang | Oct. 11, 1887 |
| 670,391 | Robinson | Mar. 19, 1901 |
| 961,093 | Astor | June 14, 1910 |
| 1,698,482 | Nicin | Jan. 8, 1922 |
| 2,101,399 | Larson | Dec. 7, 1937 |
| 2,684,109 | Youmans | July 20, 1954 |
| 2,752,056 | Lull | June 26, 1956 |
| 2,765,996 | Anderson | Oct. 9, 1956 |
| 2,839,260 | Jacobi | June 17, 1958 |
| 2,945,242 | Heiden | July 19, 1960 |
| 2,989,202 | De Canniere et al. | June 20, 1961 |

FOREIGN PATENTS

| | | |
|---|---|---|
| 1,032,495 | Germany | June 19, 1958 |
| 1,092,381 | Germany | Nov. 3, 1960 |